No. 610,629. Patented Sept. 13, 1898.
E. M. MIERS.
WHEEL HUB.
(Application filed Mar. 11, 1898.)
(No Model.) 4 Sheets—Sheet 1.

Witnesses
J. E. Cannon
J. F. Riggs.

Inventor
E. M. Miers
by C. H. Riches
his attorney

No. 610,629. Patented Sept. 13, 1898.
E. M. MIERS.
WHEEL HUB.
(Application filed Mar. 11, 1898.)

(No Model.) 4 Sheets—Sheet 2.

Witnesses
Inventor
E. M. Miers
by C. A. Riches
his Attorney

No. 610,629. Patented Sept. 13, 1898.
E. M. MIERS.
WHEEL HUB.
(Application filed Mar. 11, 1898.)
(No Model.) 4 Sheets—Sheet 3.

Witnesses   Inventor
J. E. Cameron   E. M. Miers
J. F. Riggs   by C. H. Nieles
   his attorney No. 610,629. Patented Sept. 13, 1898.
E. M. MIERS.
WHEEL HUB.
(Application filed Mar. 11, 1898.)
(No Model.) 4 Sheets—Sheet 4.

Witnesses

Inventor
E. M. Miers
by C. N. Riches
his attorney

THE NORRIS PETERS CO., PHOTO-LITHO., WASHINGTON, D. C.

UNITED STATES PATENT OFFICE.

ELIJAH M. MIERS, OF PALMERSTON, CANADA.

WHEEL-HUB.

SPECIFICATION forming part of Letters Patent No. 610,629, dated September 13, 1898.

Application filed March 11, 1898. Serial No. 673,471. (No model.)

*To all whom it may concern:*

Be it known that I, ELIJAH MISENER MIERS, of Palmerston, in the county of Wellington and Province of Ontario, Canada, have invented certain new and useful Improvements in Wheel-Hubs; and I hereby declare that the following is a full, clear, and exact description of the same.

This invention relates to certain new and useful improvements in wheels, and more particularly in that class of wheels known as "vehicle-wheels."

Heretofore the usual method of building a wheel has been to fit the spokes into the spoke-sockets of the hub, then fit the rim on the outer ends of the spokes and set the tire on the rim. This method of manufacture required the exercise of the most skilled mechanical labor and the expenditure of a comparatively considerable amount of time in building each wheel.

The object of this invention is to reverse the usual method of manufacture—that is, to make the tire and fit the rim or felly to it, then attach the outer ends of the spokes to the felly and connect the hub to the inner ends of the spokes, and so arranging this hub that when it is being placed in position it will expand the spokes tightly into place against the felly, holding them securely locked against either lateral or longitudinal displacement so long as the several parts of the wheel are assembled—and to so assemble the several parts of the wheel that in the event of injury or breakage to any of the parts the injured or broken part can be easily and readily removed and replaced by a perfected part and the parts of the wheel easily and readily reassembled; and the invention consists, essentially, of the device hereinafter set forth, and more particularly pointed out in the claims.

Figure 1:
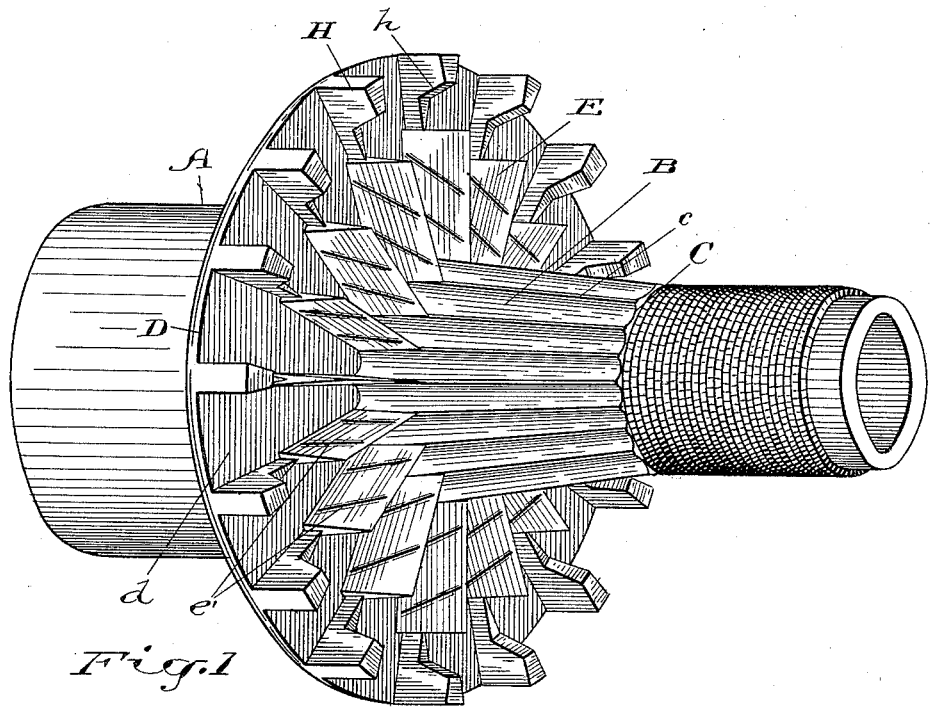
Figure 2:
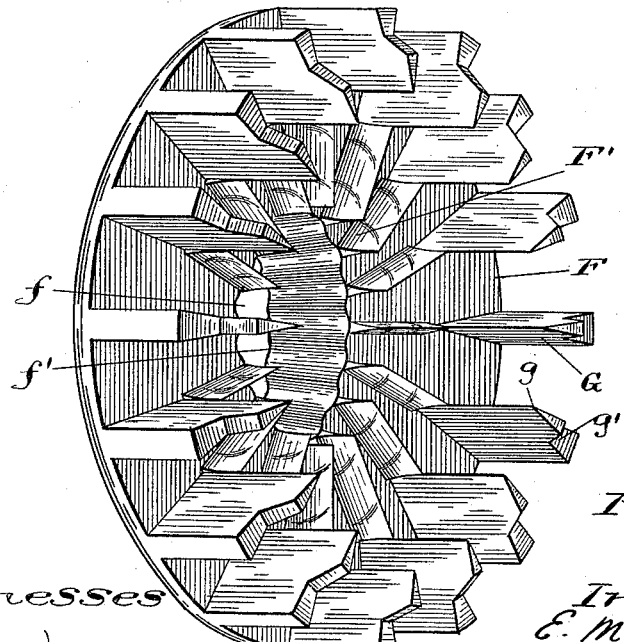
Figure 3:
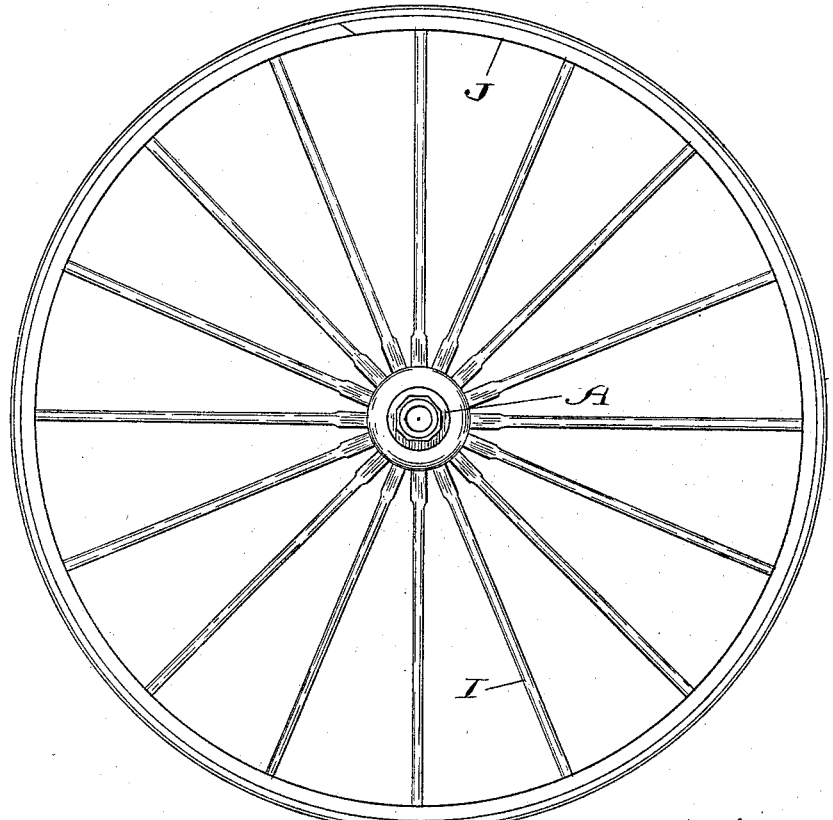
Figure 5:
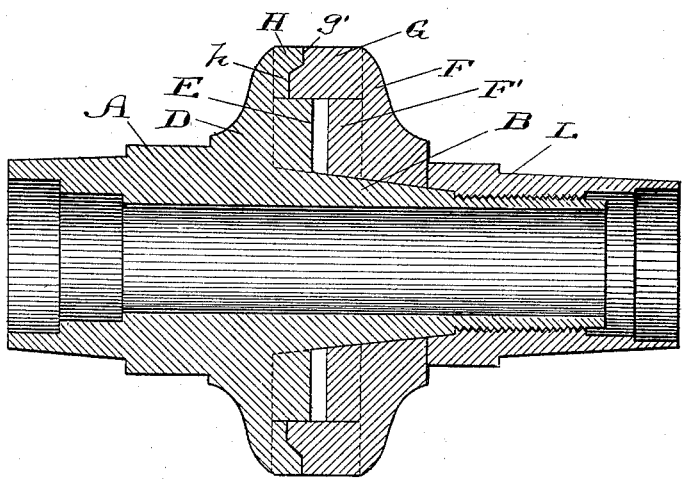
Figures 4, 6:
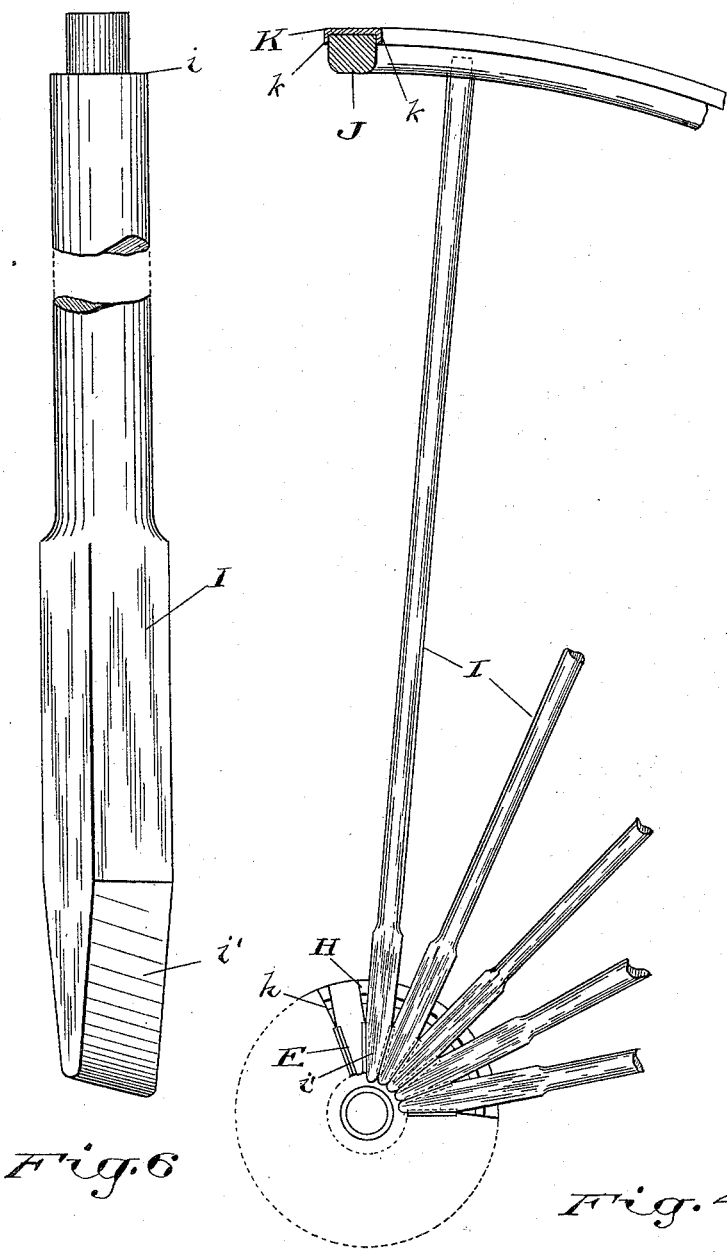
Figure 7:
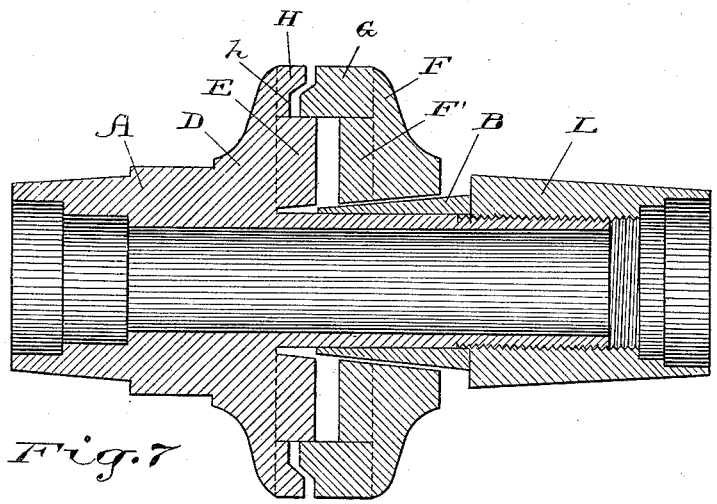
Figure 8:
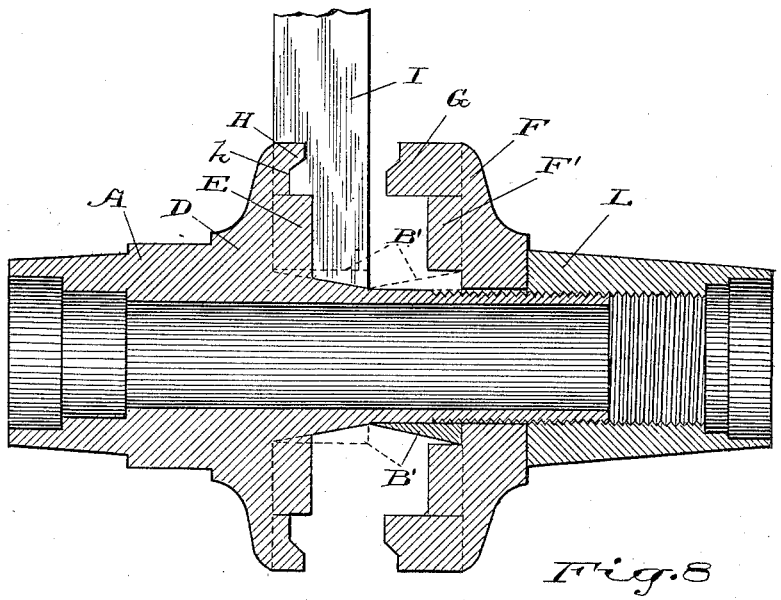

In the drawings, Figure 1 is a perspective view of the hub with the detachable spoke-flange removed. Fig. 2 is a perspective view of the detachable spoke-flange. Fig. 3 is a view of the wheel in its entirety. Fig. 4 is a view of the tire, the felly, and the spokes, showing the hub being placed in position. Fig. 5 is a cross-section of the hub. Fig. 6 is a view of one of the spokes. Fig. 7 is a section of a hub, showing a wedge-shaped enlargement connected to the lock-nut. Fig. 8 is a similar view showing a plurality of independent wedges to expand the spokes and felly.

Like letters of reference refer to like parts throughout the specification and drawings.

A represents the hub, which is of any suitable size and shape and is preferably made of metal, although it may be made of wood provided with a metallic boxing. The middle part of the hub A is provided with a frusto-conical enlargement B, diverging from the outer toward the inner end of the hub. The enlargement B is provided with a plurality of longitudinal concavities C for the inner ends of the spokes. The faces of the concavity C rise toward their edges $c$, making these edges of a higher elevation than the bottom of the face of the concavity.

D represents one of the spoke-flanges, which is preferably made integral with the hub A at the inner end of the enlargement B. The inner side face $d$ of the spoke-flange D is provided with a plurality of expanding-wedges E, corresponding in number and location with the edges $c$ of the longitudinal concavities C. Each expanding-wedge E extends from its respective edge $c$ outward radially and is of the form of a triangular prism, the point of which is remote from the side face $d$ of the spoke-flange.

F represents the removable spoke-flange, which corresponds in size and shape with the fixed spoke-flange D. The removable spoke-flange F is provided with a central bore $f$, having longitudinal concavities $f'$, corresponding in number and location with the edges $c$ of the longitudinal concavities C to receive the said edges when the removable spoke-flange is fitted into position on the said enlargement. The inner side face of the spoke-flange F is provided with a plurality of wedge-shaped partitions, corresponding in number and location with the edges $c$ of the longitudinal concavities C, the points $g$ of the wedge-shaped partitions G being in radial alinement with the edges $c$, the outer face of each partition being in the same plane as the edge of the flange and the edges of the points being in circular alinement. The inner end of each of the partitions G is cut away to form an L-shaped chamfer $g'$. The partitions G extend half-way (more or less) between the inner faces of the flanges F and D. The inner side face of the flange D is provided with a plurality of similar partitions H, corresponding in number and location with the partitions G, the ends of the partitions H being opposed to the ends of the partitions G. The inner ends $h$ of the partitions H are chamfered inversely to the chamfered ends $g'$ of the partitions G in order that the ends may interlock when the removable spoke-flange is assembled on the enlargement B. When the spoke-flange F is assembled on the enlargement and the ends of the partitions G are brought into contact with the ends of the partitions H, the partitions H and G form the sockets for the inner parts of the spokes I. The outer end of each of the spokes I is fitted in its respective spoke-hole in the rim J, the shoulder $i$ of each spoke bearing against the inner face of the rim.

K represents the tire, the inner face of which is grooved or channeled to receive the rim or felly and to provide overlapping flanges $k\ k$ to protect the sides of the rim. That part of each spoke I contained between the spoke-flanges is so tapered as to permit of the said inner ends of the spokes filling the space between the spoke-flanges and abutting against each other.

In assembling the wheel the tire is first made of the requisite size and shape. The felly is then fitted into the annular groove of the tire, after which the spokes are fitted into the spoke-holes in the felly, with their shoulders abutting against its inner face. The spokes being of exactly the same length, their inner ends are in circular alinement when assembled in position. The hub is then inserted between the spokes and pressed home until the inner face of the fixed flange D presses against the side faces of the spokes. The spokes and the hub are arranged in such relation to each other that when the hub is placed in position the inner ends of the spokes are located in the longitudinal concavity C, and when the hub has been driven home until the side face of the flange D rests against the adjacent side faces of the spokes I the divergement of the enlargement B will expand the spokes tightly against the inner face of the felly. As the enlargement B forces the spokes outward there will be a natural interval between their inner ends, and to take up that interval, or, in other words, fill the space between the inner ends of the spokes, the inner side face of the spoke-flange D is provided with expanding-wedges E. The partitions G and H hold the spokes firmly against circumferential displacement, while the inner faces of the spoke-flanges hold them against lateral displacement. When the hub and the spokes are properly assembled, the removable spoke-flange F is fitted on the hub and locked tightly in position by a lock-nut L, screwed on the outer face of the hub and tightly against the outer face of the spoke-flange. A hub constructed on this principle obviates the necessity of employing skilled labor to construct the wheel. It reverses the principle of construction by rendering it possible to make the tire first, then fit the felly to the tire, the spokes to the felly, and the hub to the spokes. The fitting of the hub to the spokes wedges the spokes tightly against the rim and presses the rim more firmly into the tire. By providing the hub with a removable flange it is possible to disassemble the parts for repair or other purposes and to easily replace them without unnecessary loss of time or trouble. The principal part of the work on a wheel of this construction is done on a machine, and when the machine-work is completed the parts can be easily and accurately assembled by unskilled labor and can be made at a much smaller cost than if made by skilled labor under the old system. Again, the wheel can be repaired by unskilled labor without sending it to the repair-shop or without having special tools for that purpose.

The side face of each of the expanding-wedges E is provided with two or more ribs $e'$, arranged diagonally to the horizontal axis of the hub, the purpose of these ribs being to grip the spokes and assist in expanding them against the felly while the hub is being fitted to the inner ends of the spokes. The removable spoke-flange F is provided with a plurality of expanding-wedges $F'$, corresponding in number and location with the expanding-wedges E and for the same purpose, each expanding-wedge $F'$ having both its faces concaved and arranged to drive the spokes well home against the side face of the fixed flange before completing the expansion of the spokes.

In Fig. 7 I have shown a hub to consist of a cylindrical boxing or sleeve, on which is screwed or otherwise fitted a lock-nut corresponding to the lock-nut L previously described and for the purpose of locking the removable flange in position. Integrally formed with the lock-nut L is a frusto-conical enlargement B, diverging from its outer end toward the lock-nut. The bore of the removable flange F is shaped to fit the frusto-conical enlargement at its greatest diameter. The perimeter of the frusto-conical enlargement is smooth in order that when the lock-nut and enlargement are being fitted into place the enlargement can revolve without interference from the adjacent or inner ends of the spokes. I can, if I so desire, separate the enlargement from the lock-nut and use the lock-nut to wedge, force, or press the enlargement into position while being fitted on the hub. The fitting of the lock-nut into place jams the removable flange tightly against the adjacent side faces of the spokes. I am also able, when the frusto-conical enlargement is made separate from the lock-nut, to provide the frusto-conical enlargement with longitudinal grooves similar to those shown and described in connection with Figs. 1 and 2.

In Fig. 8 I have shown a separate or independent wedge B' for each spoke. These wedges are placed between the ends of the spokes and the hub and are pressed home by the removable flange. The ends of the felly are mitered in order that they can be interlocked by the expansion of the spokes and felly and thus dispense with the use of the tire-plates.

Having thus fully described my invention, what I claim as new, and desire to secure by Letters Patent, is—

1. A wheel embracing in its construction a hub, a fixed flange integrally formed with the hub, a frusto-conical enlargement on the hub converging from the inner side face of the flange outward, a series of longitudinal cavities formed in the enlargement, a plurality of expanding-wedges connected to the inner face of the flange, and extending radially outward from the enlargement, a removable flange fitted on the hub, and a series of spoke-partitions dividing the space between the flanges into sockets for the spokes, substantially as specified.

2. A wheel embracing in its construction a hub, a fixed flange integrally formed with the hub, a frusto-conical enlargement on the hub converging from the inner side face of the flange outward, a series of longitudinal cavities formed in the enlargement, a plurality of expanding-wedges connected to the inner face of the flange, and extending radially outward from the enlargement, the inner end of each expanding-wedge contiguous to its respective raised portion between two concavities, partition members connected to the inner side face of the fixed flange, the inner end of each partition member contiguous to the outer end of its respective expanding-wedge, a removable flange, a series of partition members corresponding in number and location with the partition members of the fixed flange, and adapted to interlock therewith, and a nut to lock the removable flange in position when assembled, substantially as specified.

3. A wheel-hub embracing in its construction a fixed hub-section having a central bore for the boxing of the axle, a spoke-retaining flange having a plurality of radial mortises in proximity to the edge of the flange, a central conical-shaped enlargement for the hub-section projecting from the inner side of the flange having a plurality of concavities corresponding in number and position with the spaces between the mortises, a plurality of expanding-wedges connected to the inner face of the spoke-retaining flange and located one between each mortise and the raised portion of its respective concavity, and a removable hub-section adapted to be fitted on the fixed hub-section having a central bore corresponding to the conical enlargement of the fixed hub-section, and a plurality of mortises and expanding-wedges corresponding to the mortises and expanding-wedges of the fixed hub-section, substantially as specified.

Toronto, February 21, A. D. 1898.

E. M. MIERS.

In presence of—
  C. H. RICHES,
  M. A. WESTWOOD.